Feb. 1, 1949. J. M. BENEDICK 2,460,671
POSITIONING MEANS

Filed Nov. 1, 1945 3 Sheets-Sheet 1

Joseph M. Benedick,
INVENTOR.

BY
his ATTORNEY.

Feb. 1, 1949.　　　　J. M. BENEDICK　　　　2,460,671
POSITIONING MEANS
Filed Nov. 1, 1945　　　　　　　　　　　3 Sheets-Sheet 2
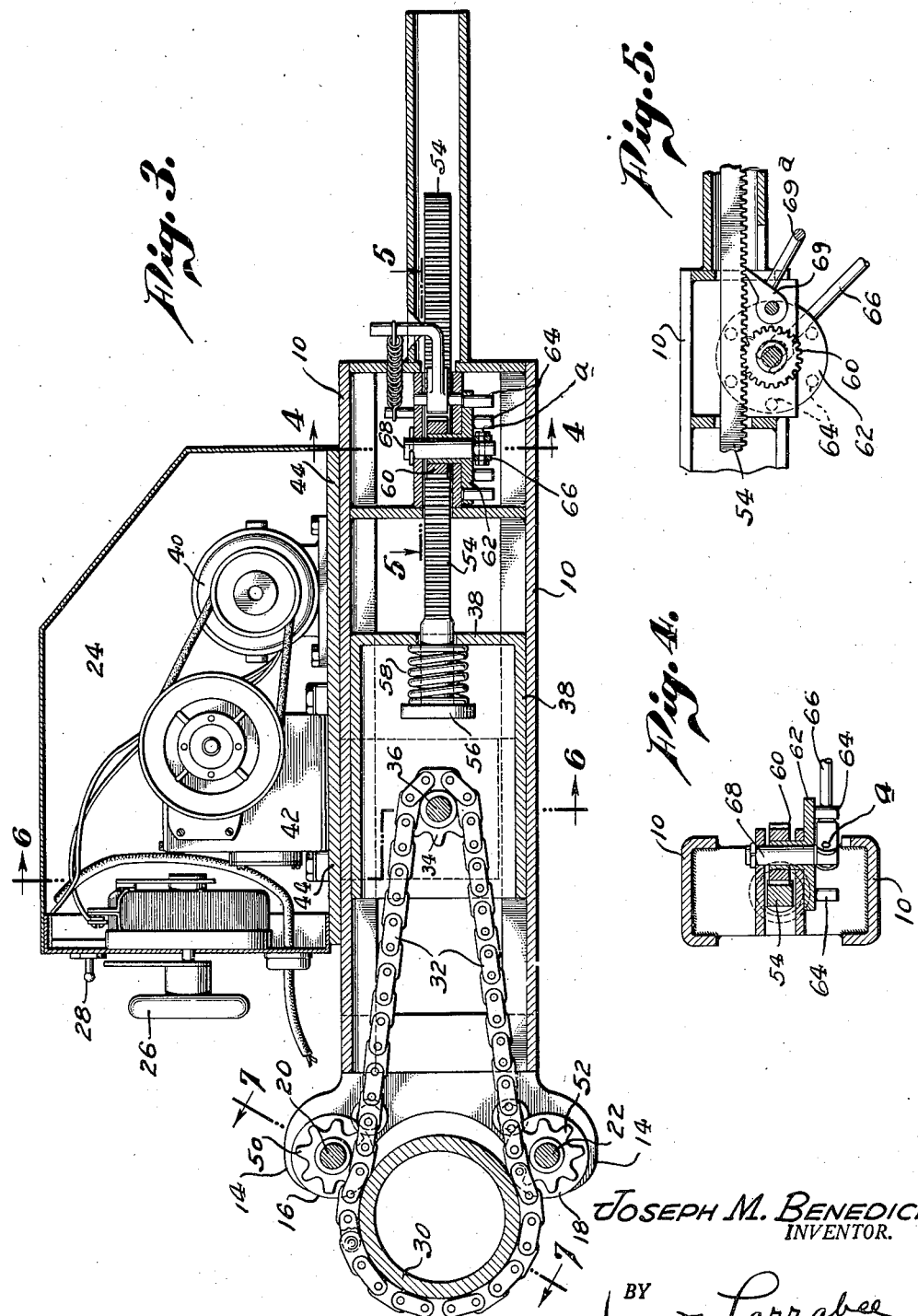
Joseph M. Benedick,
INVENTOR.
BY ↙ J. Larrabee
his ATTORNEY.

Feb. 1, 1949.　　　J. M. BENEDICK　　　2,460,671
POSITIONING MEANS
Filed Nov. 1, 1945　　　　　　　　　　　3 Sheets-Sheet 3
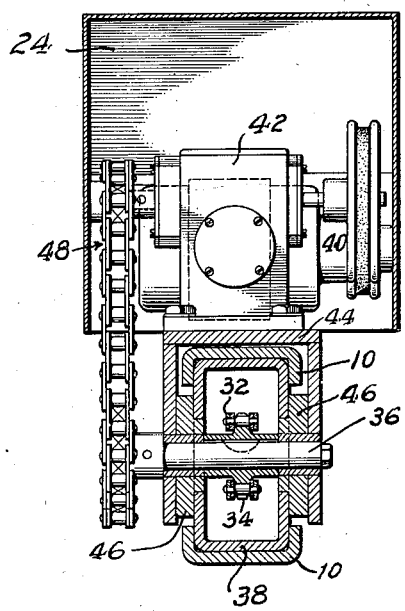
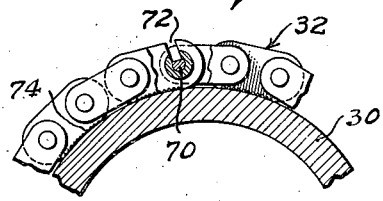
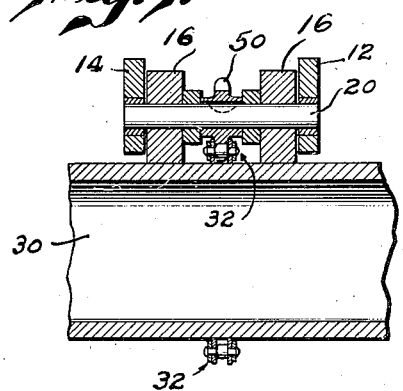
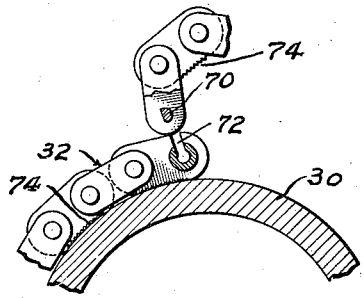
Joseph M. Benedick,
INVENTOR.
BY
his ATTORNEY.

Patented Feb. 1, 1949

2,460,671

UNITED STATES PATENT OFFICE 2,460,671

POSITIONING MEANS

Joseph M. Benedick, Wilmar, Calif.

Application November 1, 1945, Serial No. 625,990

4 Claims. (Cl. 214—1)

This invention relates to a device or machine for facilitating welding or cutting and other operations on work-pieces in which the operation is carried out on a line running around the work-piece, as for instance in cutting lengths of pipe or welding lengths of pipe together by the use of oxyacetylene torches or electrical arc welding machines.

An object of my invention is to provide a novel machine for use in the field or shop and for either aiding hand operated equipment or mechanically operated flame or arc cutting or welding equipment.

An object of my invention is to provide a novel light, portable and conveniently handled power operated machine of the kind described which greatly reduces the labor of carrying out welding, cutting, or other operations in which the work has to be rotated.

An object of my invention is to provide a novel machine capable of handling work of different sizes and contours, and to provide a simple and light, but sturdy machine capable of handling a wide variety of work-pieces.

Another object of my invention is to provide a novel machine of the type described which may be adapted to operate on a work-piece of different diameter from that previously worked on, and which adaptability may be accomplished in a minimum of time.

A further object of my invention is to provide a novel machine of the kind described, capable of rotating work-pieces of other than cylindrical contour.

A still further object of my invention is to provide a novel machine whereby objects such as pipes, tanks or vessels may be positioned along the periphery thereof to present such surfaces for coating the same with asphalt or other coating operations, as well as for reclaiming pipes, tanks or vessels.

Other objects, advantages and features of invention may appear from the accompanying drawings, the subjoined detail description and the appended claims.

The accompanying drawings illustrate the invention in a form I at present deem preferable.

Fig. 3 is a sectional view taken on line 3—3, Fig. 2, but taken on a larger scale.

Fig. 4 is a fragmentary cross-sectional view line 4—4, Fig. 3.

Fig. 5 is a fragmentary cross-sectional view on line 5—5, Fig. 3.

Fig. 6 is a cross-sectional view on irregular line 6—6, Fig. 3, looking in the direction of the arrows.

Fig. 7 is a fragmentary cross-sectional view on line 7—7, Fig. 3.

Fig. 8 is a fragmentary detail view on enlarged scale showing the arrangement for opening an endless flexible member, such as a chain, to enable it to be placed around a part to be rotated and to adjust the chain in length according to the diameter of the article to be held and rotated.

Fig. 9 is a fragmentary detail view of the chain illustrated in Fig. 8, but shown in opened position.

Figure 1:
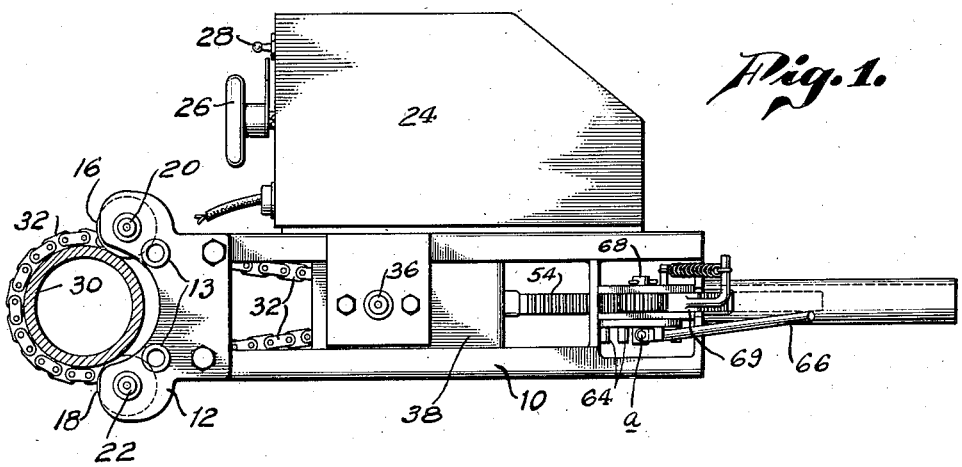
Figure 1 is a side elevation of a machine constructed in accordance with my invention, illustrated as holding a pipe which is shown in cross-section.
Figure 1:
Figure 2:
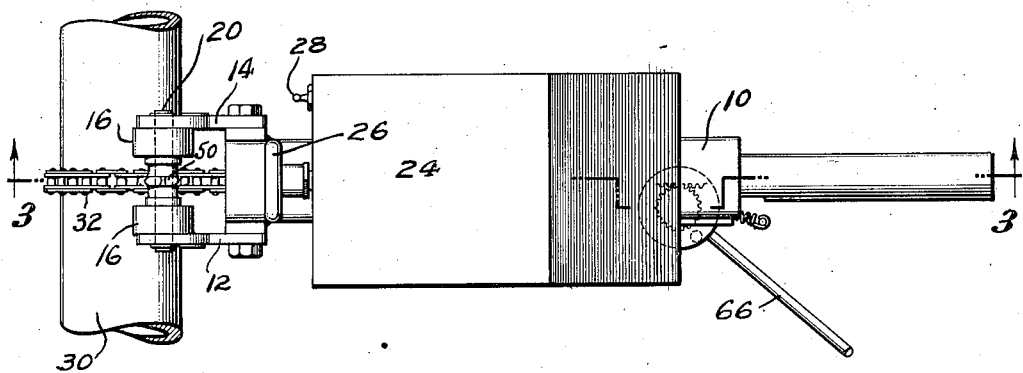
Fig. 2 is a plan view thereof showing the pipe broken away to contract the view.
Figure 2:

Referring now to Figs. 1 and 2, the numeral 10 indicates an elongated housing of generally rectangular form provided at its forward end, with spaced apart jaw plates, 12 and 14 in each of which are mounted upper 16 and lower 18 anti-friction abutments. Formed therealong are spaced apart rollers respectively mounted on shafts 20 and 22 that extend between the jaw plates 12, 14.

As shown in Fig. 1, a plurality of bearings 13 are arranged in the jaw plates 12, 14 to enable the upper and lower rollers 16 and 18 to be spaced closer together or wider apart (as shown) to properly accommodate work of different sizes. A housing 24 for an electric motor 40 is arranged above the housing 10, a rheostat control wheel 26, controlling the speed of the motor 40, and switch 28 controlling the current to motor 40, being mounted on the front of the housing 24.

The work being rotated by the device is shown for example, as a length of pipe or a tube 30, though as will later be explained, the machine is capable of rotating other shapes of work. The piece to be worked upon is rotated by means of a flexible chain 32 running over a sprocket 34 fixed to a shaft 36 carried in the walls of a box 38, mounted for sliding movement in the housing 10. The electric motor 40 and a reduction gear 42 are mounted on a base plate 44 carried by a saddle 46 mounted on the side plates of box 38.

The power of motor 40 is transmitted to the reduction gear 42 and through a sprocket and chain drive generally indicated by 48, to the shaft 36 and sprocket 34. By this arrangement, adjustment of shaft 36 carries the power unit with the shaft.

In order to cause chain 32 to wrap around the workpiece more than it otherwise would do, and to keep it properly aligned, I prefer to provide guide sprockets 50, 52 mounted on the shafts 20, 22, respectively, intermediate the rollers 16 and 18 mounted thereon. The sprockets 50, 52 may be keyed to the shafts 20 and 22. The tensioning means for the flexible member comprises a rack 54 mounted for longitudinal movement in the housing preferably protected by a projecting tubular extension of the housing 10. In the housing 10 the rack has a yielding connection at its forward end with the box 38, the yielding connection comprising a head 56 at the end of the rack and a compression spring 58 arranged between the head 56 and the inside of the rear wall of the box through which the rack projects.

The rack is moved forward or backward by gear 60 mounted on a bushing formed with a flange 62 fitted with a number of projecting pegs 64. A bar 66 is pivoted as at $a$ to a stem 68 free to rotate in gear 60. By the described construction the bar 66 may be swung against one or other of the projecting pegs 64 thus rotating the gear to move the rack to apply the desired tension to the gripping operations of the chain 32 against the article being worked upon.

The rack 54 is retained in any position desired by a spring pressed detent 69 releasable by means of a handle or bar 69a. It is pointed out that by the resilient connection between the rack and the sliding box in which the chain driving sprocket 34 is mounted, work-pieces of non-circular form may be rotated as for instance of hexagonal contour since the sprocket can be moved forwardly against the effort of the spring whenever a high point on the surface of the work has to pass over the surface of the rollers 16 or 18 or both, thus momentarily moving the axis of the work outwardly. When used to rotate long pieces of work such as when welding on the end plates of cylindrical tanks or welding lengths of pipe together, the work may be supported on a frame having pairs of rollers spaced apart from each other to support the work, the machine of the invention being secured to the frame in any convenient manner to engage and rotate the workpiece.

In order to enable work of widely different diameters to be secured in the chain 32 I provide this chain with a simple means for varying the length thereof by arranging one pair of inside links with a slot reaching from the pinhole through the edge of the link and flatten the pin so that when as shown in Fig. 9 the flattened pin 70 is turned at right angles, it may be slipped through the slot 72 and a length of chain can be readily inserted, having a slotted pair of inside links at one end, and at its other end a pair of outside links with a flattened pin extending between them. In order to increase the grip of the chain on the workpiece, I may serrate the edges of the links engaging the work as at 74.

The power and flexibility of the machine is such that it can rotate long lengths of tubing or cylindrical objects such as tanks many feet in diameter. While I have disclosed herein a preferred form of my invention, it is to be understood that various changes or modifications may be made therein, and I therefore claim all such changes or modifications as fall within the scope of the invention and as indicated by the appended claims.

I claim:

1. A machine for rotating objects to be operated upon along a line circumferentially passing around the work, including: a housing provided at one end with a plurality of bearings; a pair of shafts mounted in a corresponding pair of bearings; a pair of rollers mounted at the ends of each pair of shafts; a chain sprocket securely fastened to each of said shafts intermediate each pair of rollers; a bearing structure mounted for longitudinal movement in said housing; a shaft supported in said bearing structure; a driving chain sprocket securely fastened to said shaft supported in said bearing structure; a chain mounted on said driving chain sprocket and adapted to encircle the workpiece between said pairs of rollers and to engage with the sprockets fastened to the shafts on which the rollers are mounted; power means supported by said bearing structure and serving to drive said driving chain sprocket; means to adjust the speed at which said power means drive said chain sprocket; means for adjusting the position of said bearing structure in said housing to adjust the tension imparted to the chain encircling the object being operated upon; and a resilient connection between said adjusting means and said bearing structure.

2. A machine set forth in claim 1, and in which the chain encircling the object to be operated upon includes pairs of slotted links, and flattened connecting pins whereby links may be added to or removed from said chain to adjust the length thereof, certain of the links of said chain having serrated edges on the object contacting surface to increase the grip of the chain on the object being worked upon.

3. A machine for rotating objects to be operated upon along a line circumferentially passing around the work, including: a housing provided at one end with a plurality of shaft bearings; shafts mounted in said bearings; rollers mounted at the ends of each shaft; a chain sprocket connected to each shaft intermediate said rollers; a bearing structure mounted for longitudinal movement in said housing; a shaft supported in said bearing structure; a driving chain sprocket connected to the shaft supported in said bearing structure; a chain mounted on said driving chain sprocket and adapted to encircle the workpiece between the rollers and to engage with the sprockets connected to the shafts on which the rollers are mounted; power means to drive the driving chain sprocket; means for adjusting the position of said bearing structure in said housing to adjust the tension imparted to the chain encircling the object being operated upon; and a resilient connection between said adjusting means and said bearing structure.

4. A machine as set forth in claim 3, and in which the chain encircling the object to be operated upon is formed of links, some of which are provided with slots and some with flattened connecting pins, certain of the links of said chain having corrugated edges on the object contacting surface to increase the grip of the chain on the object being worked upon.

JOSEPH M. BENEDICK.

REFERENCES CITED

The following references are of record in the file of this patent:

UNITED STATES PATENTS

| Number | Name | Date |
| --- | --- | --- |
| 1,639,710 | Stowell | Aug. 23, 1927 |
| 1,879,346 | Lawrence | Sept. 27, 1932 |
| 2,077,277 | Smith | Apr. 13, 1937 |